(12) United States Patent
Lopez et al.

(10) Patent No.: US 9,604,422 B2
(45) Date of Patent: Mar. 28, 2017

(54) METHOD FOR PRODUCING TIRE HAVING TREAD WITH FOAMED MATERIAL AND HOLLOW TREAD PATTERN ELEMENTS

(75) Inventors: Jose Merino Lopez, Clermont-Ferrand (FR); Didier Vasseur, Clermont-Ferrand (FR); Olivia Cuscito, Clermont-Ferrand (FR); Sylvain Petit Jean, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 572 days.

(21) Appl. No.: 14/114,521

(22) PCT Filed: Apr. 27, 2012

(86) PCT No.: PCT/FR2012/050940
§ 371 (c)(1),
(2), (4) Date: Feb. 18, 2014

(87) PCT Pub. No.: WO2012/146878
PCT Pub. Date: Nov. 1, 2012

(65) Prior Publication Data
US 2014/0150943 A1 Jun. 5, 2014

(30) Foreign Application Priority Data
Apr. 28, 2011 (FR) ...................................... 11 53618

(51) Int. Cl.
*B29D 30/06* (2006.01)
*B60C 11/117* (2006.01)
(Continued)

(52) U.S. Cl.
CPC ..... *B29D 30/0662* (2013.01); *B29D 30/0606* (2013.01); *B29D 30/66* (2013.01);
(Continued)

(58) Field of Classification Search
CPC . B60C 11/00; B60C 11/032; B60C 2011/147; B29D 30/0606; B29D 2030/0612; B29D 2030/0613; B29D 30/66
See application file for complete search history.

(56) References Cited

U.S. PATENT DOCUMENTS 5,355,922 A * 10/1994 Kogure ..................... B60C 9/26
152/209.18
5,788,786 A * 8/1998 Yamauchi ............. B60C 1/0016
152/209.1
(Continued)

FOREIGN PATENT DOCUMENTS

EP 0540339 A2 5/1993
EP 0540340 A2 5/1993
(Continued)

OTHER PUBLICATIONS

Machine translation for Japan 05-077613 (no date).*
(Continued)

*Primary Examiner* — Steven D Maki
(74) *Attorney, Agent, or Firm* — Dickinson Wright PLLC

(57) ABSTRACT

A layer of cellular material forms a running layer (14A) of a tread (14) in which tread pattern elements (20, 22, 26) are made. In order to form the cellular material, an uncured blank is provided with a mass of material comprising p,p'-oxybis(benzenesulphonyl hydrazide) that forms a pore-forming agent. The uncured blank is placed in a vulcanization mold (28) comprising molding elements (30, 32, 34). At least 95% of the molding elements (30, 32, 34) each satisfy the following two conditions:
(Continued)

a) the molding element (30, 32, 34) is separated from at least one other molding element (30, 32, 34) by a distance, expressed in millimeters, of less than or equal to $DM = 6.85 + 0.0065 T3$, T, greater than or equal to 3 phr, being the amount of p,p'-oxybis(benzenesulphonyl hydrazide) in the mass of material intended to form the cellular material, b) the molding element (30, 32, 34) is intended to form a tread pattern element (20, 22, 26) having a depth at least equal to 80% of the thickness of the running layer (14A).

3 Claims, 3 Drawing Sheets

(51) Int. Cl.
  *B29D 30/66* (2006.01)
  *B60C 11/11* (2006.01)
  *B60C 11/03* (2006.01)
  *B60C 11/14* (2006.01)

(52) U.S. Cl.
  CPC ........ *B60C 11/032* (2013.04); *B60C 11/0323* (2013.04); *B60C 11/11* (2013.01); *B29D 2030/0612* (2013.01); *B29D 2030/0613* (2013.01); *B60C 2011/147* (2013.04)

(56) References Cited

U.S. PATENT DOCUMENTS

| | | | |
|---|---|---|---|
| 6,135,180 A * | 10/2000 | Nohara | B60C 1/0016 152/209.1 |
| 2010/0200133 A1* | 8/2010 | Merino Lopez | B60C 11/14 152/209.7 |
| 2010/0230021 A1* | 9/2010 | Merino Lopez | B60C 1/0016 152/209.7 |
| 2011/0088822 A1* | 4/2011 | Collette | B60C 11/1643 152/210 |

FOREIGN PATENT DOCUMENTS

| JP | 05-077613 A | * | 3/1993 |
|---|---|---|---|
| JP | 11058384 A | | 3/1999 |

OTHER PUBLICATIONS

PCT/FR2012/050940—English translation of Written Opinion of the ISA, 5 pages.
PCT/FR2012/050940, International Search Report, dated Aug. 2, 2012, 3 pages.

* cited by examiner

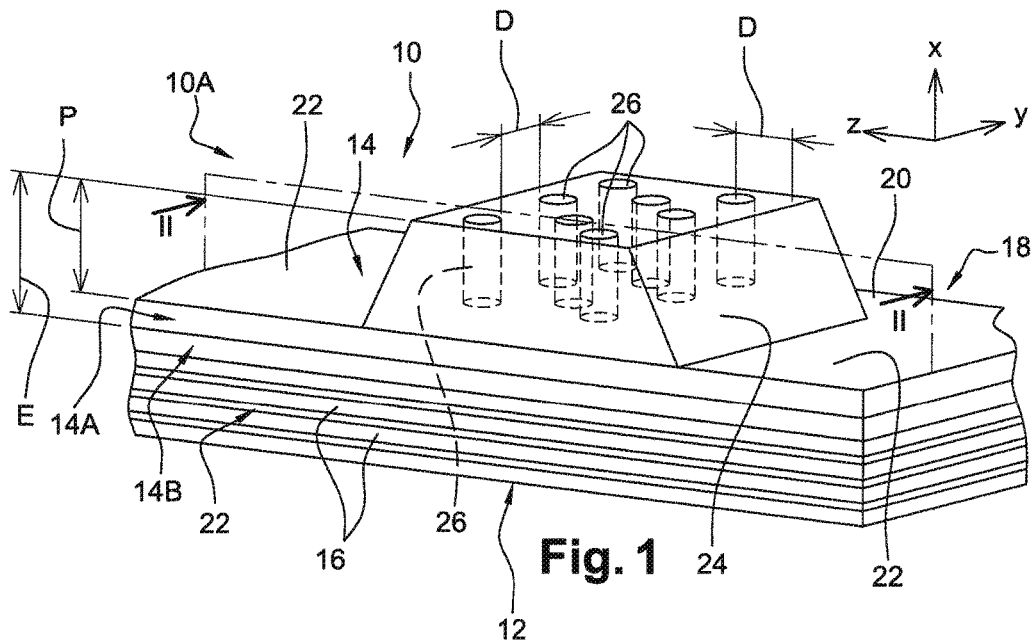
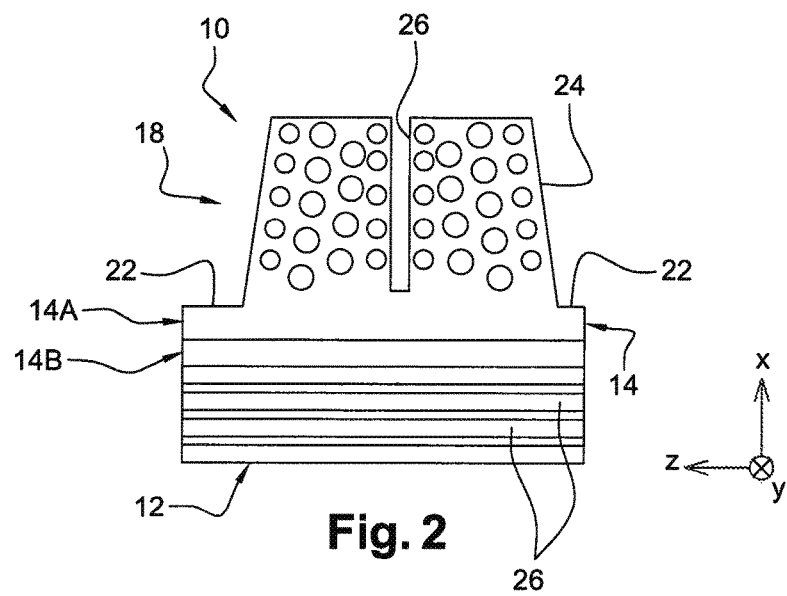

METHOD FOR PRODUCING TIRE HAVING TREAD WITH FOAMED MATERIAL AND HOLLOW TREAD PATTERN ELEMENTS

This application claims benefit of the filing date of PCT/FR2012/050940, filed Apr. 27, 2012, which claims the benefit of FR 1153618, filed Apr. 28, 2011, the entire contents of each of which are incorporated herein by reference for all purposes.

BACKGROUND

1. Field

The present disclosure relates to the field of tires comprising a cellular material.

2. Description of Related Art

In order to improve the grip of a tire, document WO 2009/003576 or WO 2009/003577 provides a tire comprising a tread that has an outer, rubber layer, subsequently referred to as a running layer, made of cellular material, in which hollow tread pattern elements are made, and an inner rubber layer having a hardness greater than that of the outer layer.

In order to manufacture such a tire, an uncured blank is produced comprising a mass of rubber, intended to form the running layer, in which a pore-forming agent is incorporated. Next, the blank is placed in a vulcanization mold and the blank is heated under pressure in this mold.

Under the effect of heat and pressure, a chemical reaction involving the pore-forming agent creates gas bubbles that form cells in the material, which therefore becomes cellular. The outer contour of the running layer is set by the mold. Once curing is complete, the tire is extracted from the mold.

In order for the grip performances to be advantageous, it is desirable for the degree of expansion of the cellular material to be greater than or equal to 50%, which requires a minimum amount of pore-forming agent in the mass of rubber intended to form the running layer.

With such a degree of expansion, after extracting the tire from the mold, it is observed that the shape of the running layer continues to evolve, so that this layer expands radially beyond the desired outer contour. This expansion is the result of the following two effects.

On the one hand, on leaving the mold, the volume of the cells containing the gas continues to increase, swelling the running layer beyond the contour set by the mold.

On the other hand, due to the difference in pressure between the moment when the tire is in the mold and the moment when the tire is taken out of the mold, an expansion of the running layer is observed on leaving the mold.

These two effects do not make it possible to obtain, on leaving the mold, a precise geometry of the running layer and therefore do not make it possible to obtain the desired performances of the tire.

Moreover, the gases dissolved in the cellular material have a tendency to accumulate within bubbles of relatively large size. These accumulated bubbles form large-sized cells that weaken the running layer and degrade the performances of the tire.

SUMMARY

One objective of the disclosure is in particular to optimize the geometry and the strength of the cellular material running layer of a tire.

For this purpose, there is disclosed an embodiment of a process for manufacturing a tire in which an uncured blank of the tire is vulcanized in a mold, this tire comprising a layer of cellular material that forms a running layer of a tread of the tire in which hollow tread pattern elements are made, the running layer having
a thickness E, and
a degree of expansion of greater than or equal to 50%,
the process being characterized in that:

the uncured blank is provided with a mass of material, comprising p'p'-oxybis(benzenesulphonyl hydrazide) that forms the pore-forming agent, this material comprising the pore-forming agent being intended to form the cellular material, the uncured blank is placed in a vulcanization mold comprising elements for molding the hollow tread pattern elements, the mold being such that at least 95% of the molding elements each satisfy the following two conditions a) and b):

a) the molding element is separated from at least one other molding element by a distance, expressed in millimeters, of less than or equal to $$DM = 6.85 + 0.0065T^3,$$

T being the amount of p,p'-oxybis(benzenesulphonyl hydrazide) in the mass of material intended to form the cellular material, and T being greater than or equal to 3 phr, the separation distance between two molding elements being the shortest distance between these two molding elements traveled between these molding elements, b) the molding element is intended to form a hollow tread pattern element having a depth at least equal to 80% of the thickness E of the running layer.

The amount T of p,p'-oxybis(benzenesulphonyl hydrazide) greater than or equal to 3 phr allows a relatively immediate expansion and an accelerated curing of the cellular material.

The conditions a) and b) require a relatively high density of deep tread pattern elements in the running layer of the tire obtained by the process according to the invention.

Thus, owing to certain embodiments, although the degree of expansion of the cellular material is greater than or equal to 50%, the density of the hollow tread pattern elements in the running layer is such that the latter make it possible to limit, or even eliminate, the geometrical variations of the running layer when the tire is taken out of the vulcanization mold. Specifically, on leaving the mold, the cellular material expands essentially in the hollow tread pattern elements which are relatively numerous (without however filling in these tread pattern elements), rather than beyond the desired outer contour. Finally, the sufficiently numerous and deep tread pattern elements make it possible, during vulcanization, to discharge any excesses of gas and therefore to avoid the formation of excessively large cavities.

Thus, the tire obtained by the process according to the invention has a strong running layer, the geometry of which is controlled.

Furthermore, it has been observed, surprisingly, that the greater the amount of p,p'-oxybis(benzenesulphonyl hydrazide), the less the running layer expands on leaving the mold, to the extent that the density of hollow tread pattern elements required can be decreased when the amount of this pore-forming agent increases. Condition a) is therefore less and less restrictive as the amount of p,p'-oxybis(benzenesulphonyl hydrazide) increases.

According to other optional features of the process described herein:

$$DM=5.9+0.005T^3;$$

the molding elements that satisfy the conditions a) and b) also satisfy the following condition: the molding element is intended to form a hollow tread pattern element chosen from
water evacuation channels that delimit, in the running layer, blocks of cellular material, and
blind holes made in these blocks so as to open radially.

Another embodiment is a tire made by implementing the process as defined above.

BRIEF DESCRIPTION OF DRAWINGS

The invention will be better understood on reading the description that follows, given solely by way of example and with reference to the drawings, in which:

FIG. 1 is a perspective view with cross sections along axial and radial planes of one part of a tire manufactured according to a process according to a first embodiment of the invention;

FIG. 2 is a cross-sectional view along the plane II-II from FIG. 1;

Figure 3:
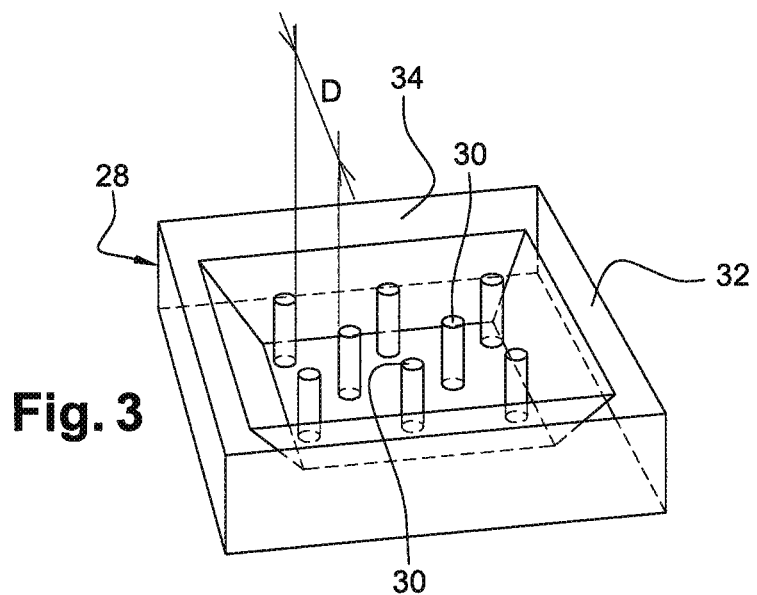
FIG. 3 is a perspective view of one part of a vulcanization mold that makes it possible to manufacture the tire represented in FIGS. 1 and 2.

On some of the figures that represent a tire, a marker has been indicated that comprises the axes X, Y, Z that are orthogonal to one another, corresponding to the customary radial X, axial Y and circumferential Z orientations of the tire.

DETAILED DESCRIPTION OF SPECIFIC EMBODIMENTS

Represented in FIGS. 1 and 2 is one part of a tire 10 manufactured according to a process according to a first embodiment of the invention. In these figures, the tire 10 has a desired outer contour after its removal from a vulcanization mold.

The tire 10 comprises a reinforcement layer 12 covered by a tread 14.

The reinforcement layer 12, known per se, comprises metal or textile reinforcers 16 embedded in a conventional rubber.

The tread 14 comprises an outer rubber layer, referred to as a running layer 14A, made of cellular material, in which hollow tread pattern elements 18 are made, and an inner rubber layer 14B having a hardness greater than that of the outer layer. The inner layer 14B is therefore inserted radially between the running layer 14A and the reinforcement layer 12.

The running layer 14A has a thickness E. The material of the running layer 14A has a degree of expansion greater than or equal to 50%. This degree of expansion can be measured using a process and means that are known per se.

The hollow tread pattern elements 18 form elements chosen from water evacuation channels 20, 22 that delimit, in the running layer 14A, blocks 24 of cellular materials, and blind holes 26, made in these blocks 24 so as to open radially.

The water evacuation channels 20, 22 form, for example, circumferential grooves or substantially transverse channels.

In the tire 10 manufactured according to the process according to the first embodiment of the invention, the blind holes 26 have a general cylindrical shape.

At least 95% of the tread pattern elements 20, 22, 26 each satisfy the following condition: the tread pattern element has a depth P at least equal to 80% of the thickness E of the running layer 14A.

The blind holes 26 may be uniformly distributed in the blocks 24, for example distributed in staggered rows.

The main steps of the process according to the first embodiment of the invention enabling the manufacture of the tire 10 illustrated in FIGS. 1 and 2 will be described below.

According to this process, an uncured blank of the tire is vulcanized in a vulcanization mold 28, one part of which has been represented in FIG. 3.

In this FIG. 3, the part of the mold 28 that has been represented is intended to mold a block 24. For this purpose, it especially comprises molding elements 30 in the form of cylindrical fingers, intended for the molding of the hollow tread pattern elements formed by the blind holes 26. The part of the mold 28 also comprises molding elements 32, 34 intended to participate in the molding of the hollow tread pattern elements formed by the water evacuation channels 20, 22.

The mold 28 is such that at least 95% of the molding elements each satisfy the following two conditions a) and b):

a) the molding element is separated from at least one other molding element by a distance D, expressed in millimeters, of less than or equal to $$DM=6.85+0.0065T^3,$$

T being the amount of p,p'-oxybis(benzenesulphonyl hydrazide) in the mass of material intended to form the cellular material, and T being greater than or equal to 3 phr, b) the molding element is intended to form a hollow tread pattern element having a depth at least equal to 80% of the thickness E of the running layer.

The separation distance D between two molding elements is the shortest distance between these two molding elements traveled between these molding elements.

Preferably, $DM=5.9+0.005T^3$.

It will be noted that the molding elements 30, 32, 34 that satisfy the conditions a) and b) are intended to form a hollow tread pattern element chosen from
water evacuation channels 20, 22, and
blind holes 26 made in the blocks 24.

According to the process in accordance with the first embodiment of the invention, firstly, the uncured blank is provided with a mass of material comprising a pore-forming agent. This mass of material is intended to form the running layer 14A made of cellular material. The pore-forming agent comprises p,p'-oxybis(benzenesulphonyl hydrazide).

Then, the uncured blank is placed in the vulcanization mold 28 comprising elements for molding the hollow tread pattern elements.

After vulcanization, the tire is removed from the mold 28.

Figure 4:
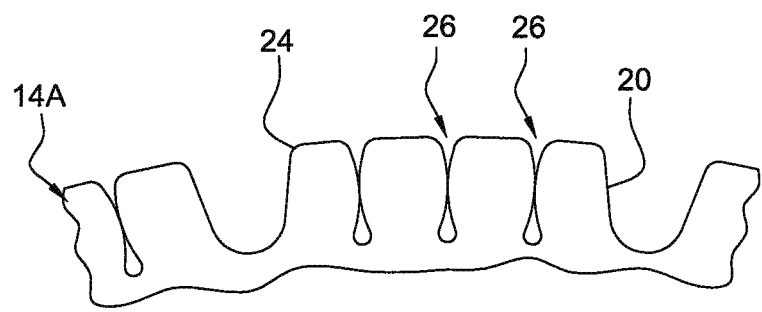
FIG. 4 is an axial cross-sectional view of the tire represented in FIGS. 1 and 2 after having been removed from the mold and after any expansion of the cellular material.

As is represented in FIG. 4, on leaving the mold, the cellular material of the running band 14A expands essentially in the hollow tread pattern elements, especially the elements 20, 26, which are relatively numerous (without however filling in these tread pattern elements), rather than beyond the desired outer contour as represented in FIGS. 1 and 2.

However, it has been observed, surprisingly, that the greater the amount T of p,p'-oxybis(benzenesulphonyl hydrazide), the less the running layer 14A expands on leaving the mold.

Figure 5:
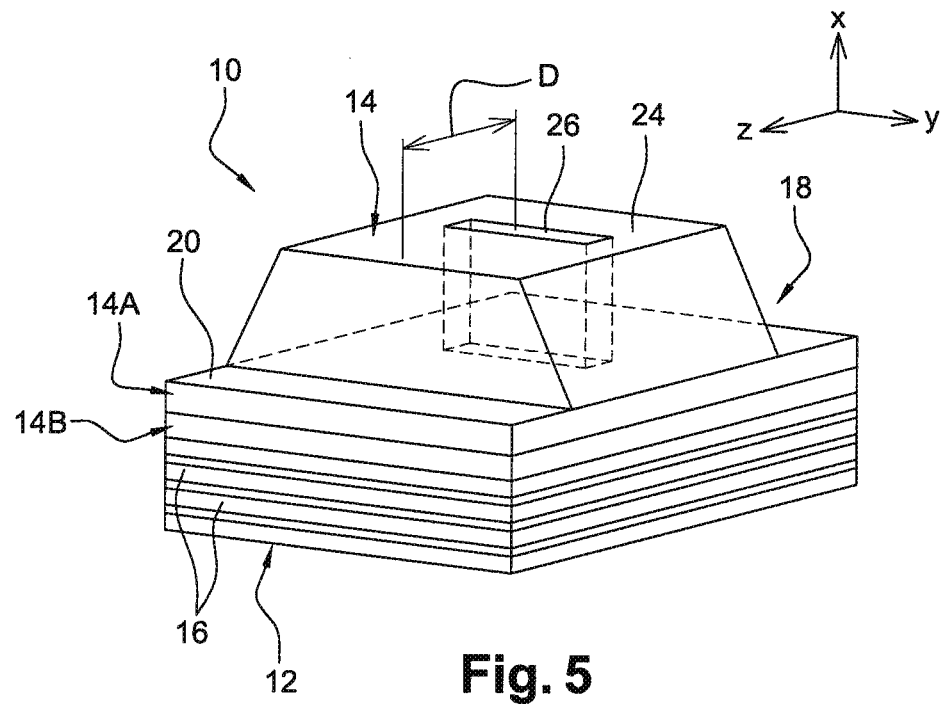
FIG. 5 is a view similar to that of FIG. 1 of one part of a tire manufactured according to a process according to a second embodiment of the invention.

In FIG. 5, one part of tire 10 manufactured according to a process according to a second embodiment of the invention has been represented. In this FIG. 5, the elements similar to those of the preceding figures are denoted by identical references.

In this case, unlike the first embodiment of the invention, the blocks 24 may comprise at least one blind hole 26 in the general shape of a parallelepipedal slot that opens radially.

Figure 6:
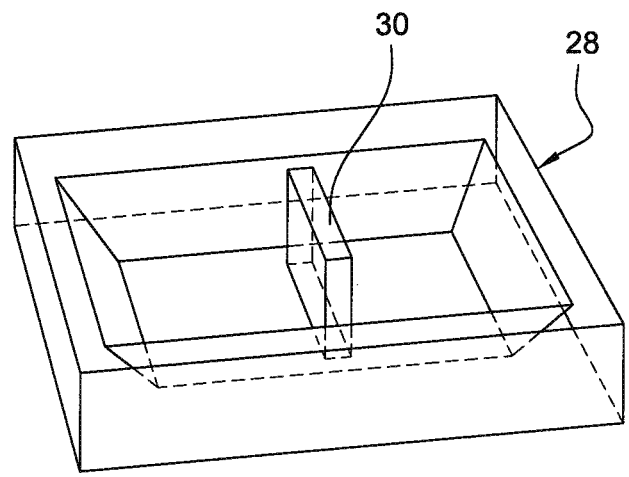
FIG. 6 is a perspective view of one part of a vulcanization mold that makes it possible to manufacture the tire represented in FIG. 5.

The process for manufacturing the tire 10 represented in FIGS. 5 and 6, according to the second embodiment of the invention, is substantially similar to that according to the first embodiment of the invention.

However, in the case of the process according to the second embodiment of the invention, the part of the vulcanization mold 28 comprises a molding element 30 of general parallelepipedal shape complementary to that of the blind hole 26.

The invention is not limited to the embodiments described above.

In particular, it will be noted that the tread pattern elements made in the running band may have various shapes.

The invention claimed is:

1. A process for manufacturing a tire in which an uncured blank of the tire is vulcanized in a mold,
    this tire comprising a layer of cellular material that forms a running layer of a tread of the tire in which hollow tread pattern elements are made,
    the running layer having
       a thickness E, and
       a degree of expansion of greater than or equal to 50%,
    wherein:
    the uncured blank is provided with a mass of material, comprising p,p'-oxybis(benzenesulphonyl hydrazide) that forms a pore-forming agent, this material comprising the pore-forming agent being intended to form the cellular material,
    the uncured blank is placed in a vulcanization mold comprising molding elements for molding the hollow tread pattern elements,
    the mold being such that at least 95% of the molding elements each satisfy the following two conditions a) and b):
    a) setting a value DM during the manufacturing process, and selecting a blowing agent so that the following relationship is maintained: $DM=6.85+0.0065\ T^3$,
    the molding element is separated from at least one other molding element by a separation distance, expressed in millimeters, of less than or equal to DM,
    T being the amount of p,p'-oxybis(benzenesulphonyl hydrazide) in the mass of material intended to form the cellular material, and T being greater than or equal to 3 phr,
    the separation distance between two molding elements being the shortest distance between these two molding elements traveled between these molding elements, and is based on the setting of the DM and the selecting of the blowing agent,
    b) the molding element is for forming a hollow tread pattern element having a depth at least equal to 80% of the thickness E of the running layer.

2. The process according to claim 1, in which $DM=5.9+0.005\ T^3$.

3. The process according to claim 1 or 2, in which the molding elements that satisfy the conditions a) and b) also satisfy the following condition: the molding element is a hollow tread pattern element chosen from
    water evacuation channels that delimit, in the running layer, blocks of cellular material, and
    blind holes made in these blocks so as to open radially.

* * * * *